(12) United States Patent
Hajmousa

(10) Patent No.: US 7,932,484 B2
(45) Date of Patent: Apr. 26, 2011

(54) LASER TRANSMITTER HAVING GIMBAL SUPPORT AND METHOD OF PREVENTING THE GIMBAL SUPPORT FROM CONTACTING THE TRANSMITTER HOUSING

(75) Inventor: Ayman Hajmousa, Washington, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 514 days.

(21) Appl. No.: 12/041,147

(22) Filed: Mar. 3, 2008

(65) Prior Publication Data
US 2009/0231596 A1    Sep. 17, 2009

(51) Int. Cl.
*G01C 17/38* (2006.01)
(52) U.S. Cl. .................................... 250/216; 250/234
(58) Field of Classification Search .................. 250/234, 250/216; 356/615, 614, 138
See application file for complete search history.

(56) References Cited

U.S. PATENT DOCUMENTS

| | | | |
|---|---|---|---|
| 7,107,168 B2 * | 9/2006 | Oystol et al. | 702/94 |
| 7,205,527 B2 * | 4/2007 | Li et al. | 250/221 |
| 7,304,296 B2 * | 12/2007 | Mills et al. | 250/239 |

\* cited by examiner

*Primary Examiner* — Tony Ko
(74) *Attorney, Agent, or Firm* — Dinsmore & Shohl LLP

(57) ABSTRACT

A laser transmitter has a transmitter housing and a laser source in the housing. A gimbal support arrangement supports the laser source in the housing and includes a gimbal motor arrangement for moving the gimbal support arrangement and said laser source in said housing. A gimbal motor drive circuit actuates the gimbal motor arrangement to cause the gimbal support arrangement to move in said housing. A plurality of optical proximity sensors sense the orientation of said gimbal support arrangement to the interior of said housing. By this arrangement, damage to the transmitter is prevented.

20 Claims, 7 Drawing Sheets

LASER TRANSMITTER HAVING GIMBAL SUPPORT AND METHOD OF PREVENTING THE GIMBAL SUPPORT FROM CONTACTING THE TRANSMITTER HOUSING

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

The present invention relates to laser transmitters of the type that are useful for surveying or for spatial positioning at a construction site or elsewhere. Such laser transmitters project a thin beam of laser light or a fan-shaped beam of laser light, and rotate the beam about a rotation axis, have been in use for a number of years at construction sites. Such transmitters can be used with manual surveying systems and also as a part of automated surveying systems. Laser transmitters of this type can also be used in spatial positioning systems that provide for control of earthmoving machines, and the like, to shape a construction site to a desired contour.

Laser transmitters of this type typically have self-leveling and automatic orienting capabilities. The laser transmitter is typically positioned at a worksite on a support tripod and then roughly leveled manually. A worker will manually adjust the transmitter housing while watching bubble vials. Fine leveling is then effected automatically by adjusting the orientation of the laser and associated optics inside the transmitter housing. Additionally, if it is desired to project a slightly tilted beam, the orientation of the laser and associated optics will be tilted inside the transmitter housing. In either event, the housing remains stationary and electric motors drive a gimbal mounting arrangement that supports the laser and associated optics to achieve the desired level or tilted orientation automatically. A control arrangement uses electrical level vials that move with the gimbal mounting arrangement, and that provide an electrical indication when the gimbal mounting arrangement has been moved to the desired orientation.

A difficulty encountered with such an arrangement is that the level motors could conceivably cause the gimbal arrangement to tilt by too much with respect to the housing, with the result that the laser or other movable internal components could be driven into contact with some portion of the housing or with other parts of the transmitter. Such contact could cause damage to the laser or other parts of the transmitter. In the past, to prevent this damage, a series of mechanical limit switches have been used that are actuated when the laser and associated structures reach the end of their normal range of travel in either direction along either of two orthogonal axes. Such mechanical limit switches are difficult to configure and calibrate, however. Further, mechanical limit switches are closed when the end of travel is reached, but provide no indication as the end of travel is about to be reached. Therefore, the movement of the transmitter internal gimbal supports must necessarily be undesirably slow.

Other problems result from using mechanical limit switches to detect the end of travel of the gimbal support arrangement. Because mechanical limit switches must necessarily be relatively close to bosses or other structures on the interior of the transmitter housing so that the switches can be actuated by contact with the bosses or other structures, a transmitter using such switches is not as rugged as might be desired. If the transmitter is inadvertently dropped and one of the switches is relatively close to the interior of the housing, the switch can strike the interior of the housing, resulting in damage.

Further, it will be appreciated that if, for example, four switches used in a transmitter to detect the end of travel in either direction along either of two orthogonal axes, it is possible that the gimbal support arrangement may be moved so that the maximum tilt of the laser and components with respect to the housing actually occurs along an axis that is between the axes on which the mechanical switches is situated. To take this into account, the mechanical limit switches must be arranged to be actuated when the gimbal support arrangement is tilted by a lesser amount along an axis on which the switches are positioned. As a consequence, the interior of the housing must be designed in a way that is less than optimum to assure that the gimbal support arrangement and other movable components do not come into contact with the housing.

SUMMARY OF THE INVENTION

These difficulties are overcome by a laser transmitter according to the present invention that comprises a transmitter housing, a generally flat, circuit board stator, and a rotor defining a central opening. The transmitter further includes a bearing supporting the rotor for rotation about an axis that that is generally perpendicular to the generally flat, circuit board stator, and that is aligned with the center of the central opening. A laser source is mounted on the stator for providing a beam of laser light that is directed outward from the circuit board stator in alignment with the rotation axis. A pentaprism assembly is mounted on the rotor for rotation therewith. The pentaprism assembly receives the beam of laser light through the central opening and redirects at least a portion of the laser light outward in a direction normal to the rotation axis. A gimbal support supports the stator within the transmitter housing. A gimbal motor arrangement orients the gimbal support. A plurality of pairs of light sources and light sensors sense the proximity of the circuit board stator with respect to the interior of the transmitter housing.

A plurality of reflectors on the interior of the transmitter reflect light from the light sources to corresponding light sensors in the pairs. The reflectors may be adjustably positioned with respect to the housing.

A laser transmitter may comprise a transmitter housing, a laser source in the housing, and a gimbal support arrangement for supporting the laser source in the housing. The gimbal support arrangement further includes a gimbal motor arrangement for moving the gimbal support arrangement and the laser source in the housing. A gimbal motor drive circuit actuates the gimbal motor arrangement to cause the gimbal support arrangement to move in the housing. A plurality of optical proximity sensors sense the orientation of the gimbal support arrangement with respect to the interior of the housing. By this arrangement, damage to the laser transmitter that might otherwise result from movement within the transmitter housing is prevented.

The transmitter may include a plurality of reflectors inside the transmitter housing, for reflecting light back to the optical proximity sensors. The reflectors may be adjustably positioned with respect to the housing.

There may be four optical proximity sensors for sensing the proximity of the sensors to the interior of the housing, with the four proximity sensors being spaced uniformly around the periphery of the gimbal support arrangement. The outputs of the four optical proximity sensors may be combined to determine the amount of tilt of the gimbal support arrangement in the direction of maximum tilt.

A method of positioning a laser source and support structure in the housing of a laser transmitter of the type having a gimbal support for supporting the laser source and support structure, includes the steps of providing a plurality of optical sensors on the support structure, sensing the proximity of the interior of the transmitter housing with each of the optical sensors, and preventing the support structure from being moved into contact with the interior of the transmitter housing. The maximum tilt of the support structure is determined based on outputs from the optical sensors. The maximum tilt is limited to a predetermined maximum such that the support structure is prevented from contacting the interior of the housing. The optical sensors may be positioned around the periphery of the support structure. More particularly, four optical sensors may be equally spaced around the periphery of the support structure. The maximum tilt of the support structure may be determined based on outputs from the four optical sensors, such that the maximum tilt can be determined regardless of the axis along which it occurs.

Accordingly, it is an object of the present invention to provide a laser transmitter in which the construction and operation of the transmitter are improved.

DETAILED DESCRIPTION OF THE PREFERRED EMBODIMENTS

Figure 1:
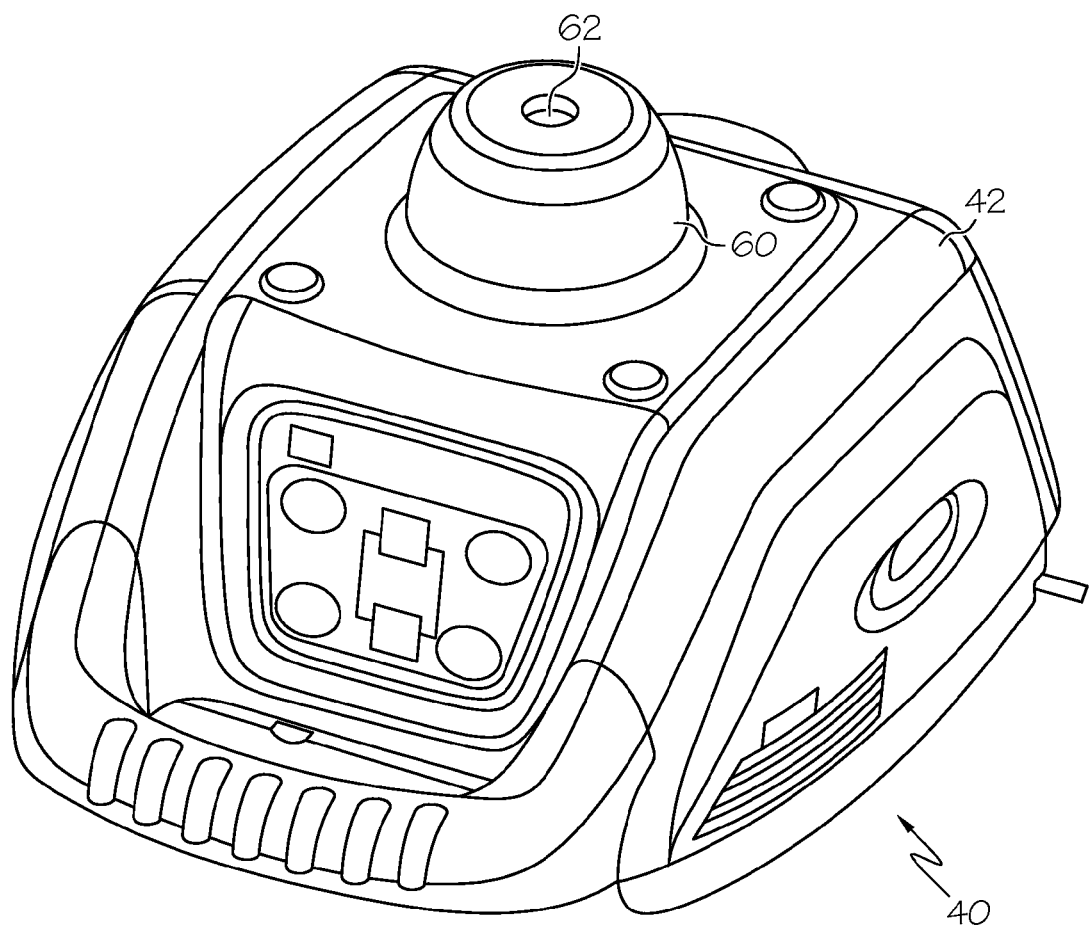
FIG. 1 is a perspective view of a laser transmitter according to the present invention.

FIGS. 1 through 4 illustrate a laser transmitter 40 constructed according to the present invention. The laser transmitter 40 has a transmitter housing 42. The transmitter includes a generally flat, circuit board stator 68, a rotor 70 including a plurality of magnets 66 mounted in a ring around a central opening in rotor 70, a bearing 64, supporting the rotor 70 for rotation about a rotation axis that extends through the central opening, and a pentaprism assembly 50 including an optics holder 71 mounted on the rotor 70 for rotation therewith. If desired, the optics holder 71 may be molded as a unitary upper portion of the rotor 70, as shown. Also, if desired, the plurality of magnets 66 may be a continuous ring magnet having a plurality of poles arranged therearound. A laser source 44, including laser diode 52, collimating lens 56 and generally cylindrical housing 59, directs a beam of laser light generally upward in alignment with the axis of rotation of the rotor 70, with respect to the frame of reference illustrated in FIG. 2A, to pentaprism 53 of the pentaprism assembly 50. The pentaprism assembly 50 receives the beam of laser light through the central opening in the rotor 70 and redirects at least a portion of the laser light outward through opening 58 in cover 60 in a direction normal to the rotation axis. The path of the laser beam is illustrated by dashed line 61 in FIGS. 3 and 4. It will be noted that the laser diode 52 emits a beam that is then collimated by lens 56 positioned within the rotor 70. Lens 56 is positioned a substantial distance from the circuit board stator 68 and the laser diode 52 to permit the beam to widen to the desired diameter prior to collimation.

Figure 2A:
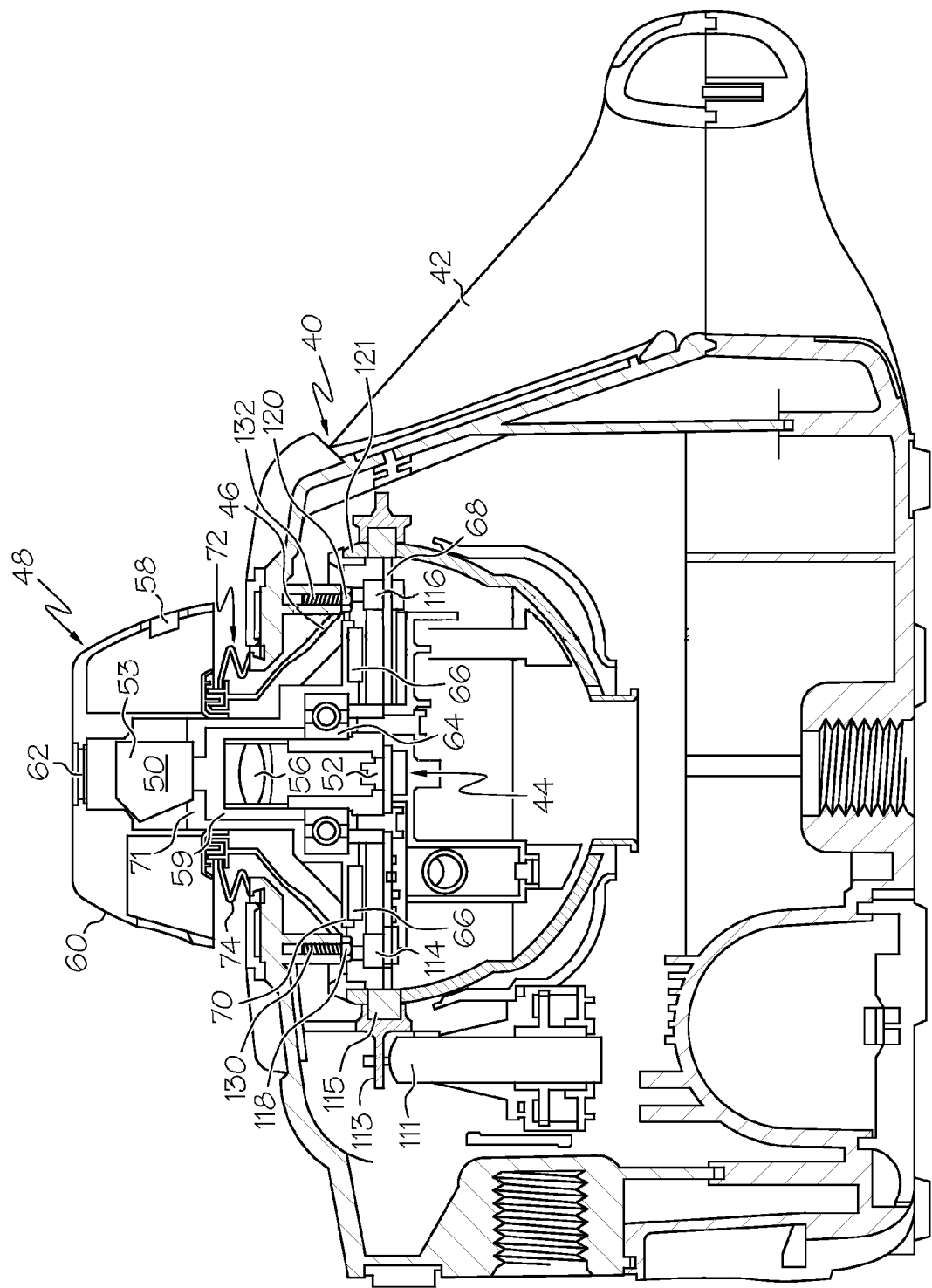
FIG. 2A is a sectional view of the laser transmitter taken through the rotatable laser head.

As shown in FIG. 2A, the laser transmitter has a non-rotatable portion 46 and a rotatable laser head 48. Rotatable laser head 48 includes the pentaprism element 53 which redirects a laser beam that is generated by a laser diode 52 and that passes upward through housing 59 and lens 56. The beam is directed radially outward through an opening 58 in cover 60 by the pentaprism 53, and is swept around the axis of rotation of the rotor 70. A portion of the beam may also pass upward through the pentaprism 53, the upper surface of which may be only partially reflective, through optical wedge 55, and pass out of the cover 60 through opening 62 in the same direction as the rotation axis of rotor 70. Optical wedge 55 prevents the beam from being refracted as it passes out of the pentaprism assembly.

A flexible bellows seal 74 is provided in the opening 72, surrounding the laser generating unit and sealing the opening between the housing 42 and the non-rotatable portion 46. The flexible bellows seal 74, extends from the edge of the opening 72 to the non-rotatable portion 46 and a plurality of annular accordion pleats which flex when the laser generating unit is tilted with respect to the housing 42. The flexible bellows seal 74 may be made of an elastomer material, such as a silicone rubber. The bellows seal 74 permits the laser diode 52 and associated optics and other structures to be tilted with respect to housing 42.

The rotor rides on bearing 64 and is driven by the interaction of a ring of magnets 66 and a pair of coils 75 that are included on generally flat, circuit board stator 68. The bearing 64 has an inner race 95 mounted on the generally cylindrical housing 59 and an outer race 97 secured to the rotor 70. The bearing 64 includes a plurality of bearing balls 100 that are arranged in a single ring between inner race 95 and outer race 97. A magnetic shield plate 102, made of a magnetic material, such as steel, is mounted on the side of the circuit board stator 68 opposite the rotor 70. Plate 102 provides a magnetic attraction between the plurality of magnets 66 that are arranged in a ring on the rotor 70 and the magnetic shield plate 102. Plate 102 is preferably annular in shape, although other shapes may be used. The plate 102 applies a downward force to the rotor 70 that reduces or eliminates play in the bearing 64 that may result from manufacturing tolerances or from bearing wear.

Figure 4:
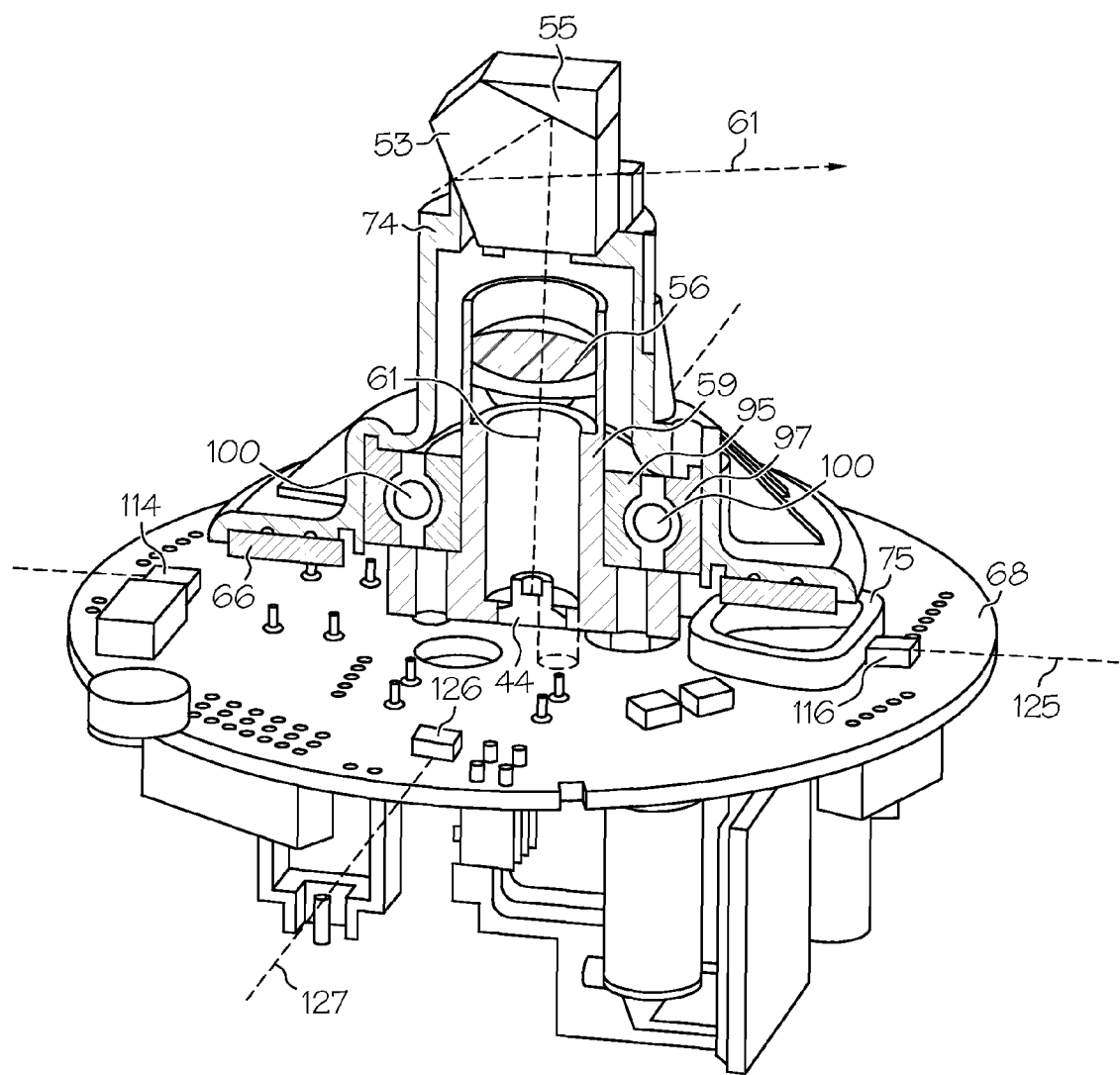
FIG. 4 is a perspective view of the portion of the transmitter shown in FIG. 3, but with some of the parts broken away.
Figure 5:
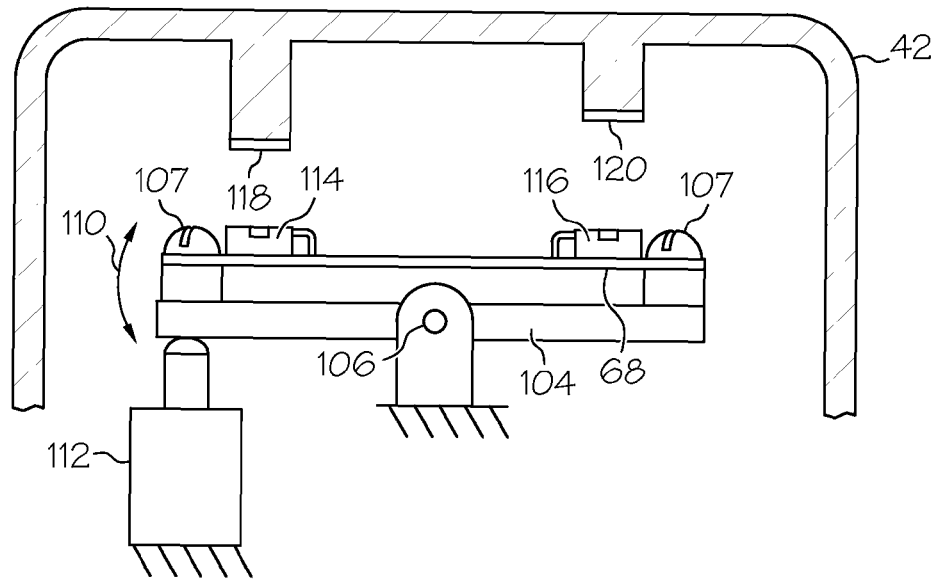
FIG. 5 is a diagrammatic representation of a gimbal support and optical sensor arrangement useful in understanding the present invention.

FIG. 5 is a diagrammatic representation of the end of travel detection arrangement, useful in illustrating the manner in which components of the laser transmitter tilt with respect to the housing, and the way in which the amount of tilt of those components with respect to those components with respect to the housing is detected and limited. The illustrated construction does not correspond precisely to the structure of FIGS. 1 through 4, but corresponding structural elements have been given corresponding reference numerals. A gimbal arrangement is diagrammatically represented in two dimensions as a plate 104 that pivots about a stationary pivot 106. The plate 104 is secured to circuit board 68 by bolts 107, and pivots about an axis that is perpendicular to the plane of the drawing, as indicated by arrow 110. The plate 104 is moved by motor 112 and this tilts the circuit board 68, raising one end while lowering the other end. The present invention monitors the movement of the circuit board 68 and limits the range of movement of the circuit board 68 and the other structure it supports, such as the laser source and optics (not shown in FIG. 5), so that the circuit board 68 and supported structure do not contact the inner surface of the housing 42. It will be appreciated that such contact could cause significant damage to the moving transmitter components. Additionally, the transmitter accomplishes this in a way that keeps the moving structure far enough from the interior surface of the housing so that the vibration produced by accidentally dropping the transmitter or other rough handling will not cause the moving transmitter components to come into contact with the interior of the housing and be damaged. Finally, the transmitter accomplishes this in a way that maximum tilting of the moving transmitter components along any axis can be determined and limited.

Figure 6:
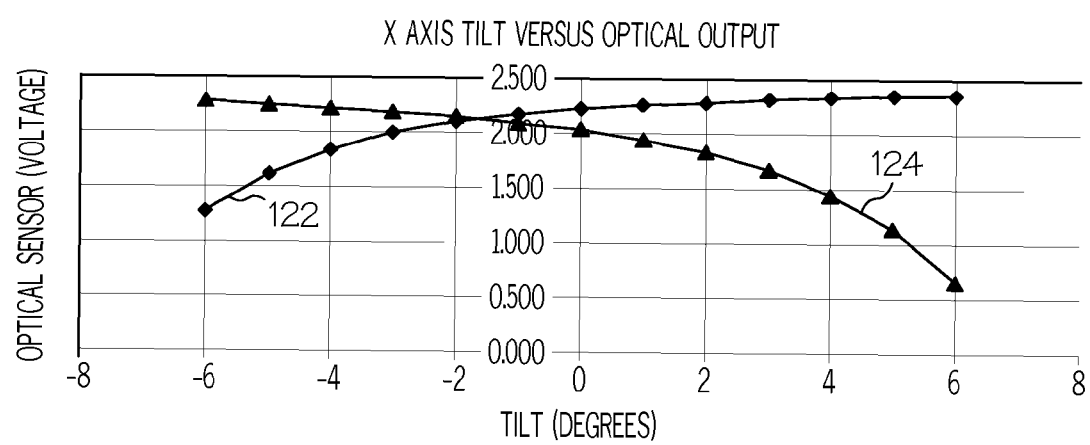
FIG. 6 is a graph showing the outputs from the optical sensors of the arrangement of FIG. 5.

The transmitter incorporates optical sensors, such as the XPI-A7 photo-interrupter, sold by SunLED Company Limited, 105 Hewlett Centre, 54 Hoi Yuen Rd., Kwun Tong, Kowloon, Hong Kong. This optical sensor includes a photo diode that provides a source of light, and a photo detector that detects light which is generated by the photo diode and reflected back to the photo detector by a reflective surface. The closer the reflective surface, the greater the amount of light is reflected back to the photo sensor, within certain limits. FIG. 6 illustrates the voltage outputs of optical sensors 114 and 116 when receiving light from reflectors 118 and 120, respectively, as the plate 104 is tilted from 6 degrees to the left to 6 degrees to the right. Curve 122 shows the output from optical sensor 114, while curve 124 shows the output from the sensor 116. It will be noted that each of the sensors 114 and 116 provides the most useful output information as it is moving further away from its associated reflector. As a sensor moves closer to a corresponding reflector, the curves 122 and 124 show a marked flattening, and therefore a corresponding reduction in accuracy of the output.

Figure 2B:
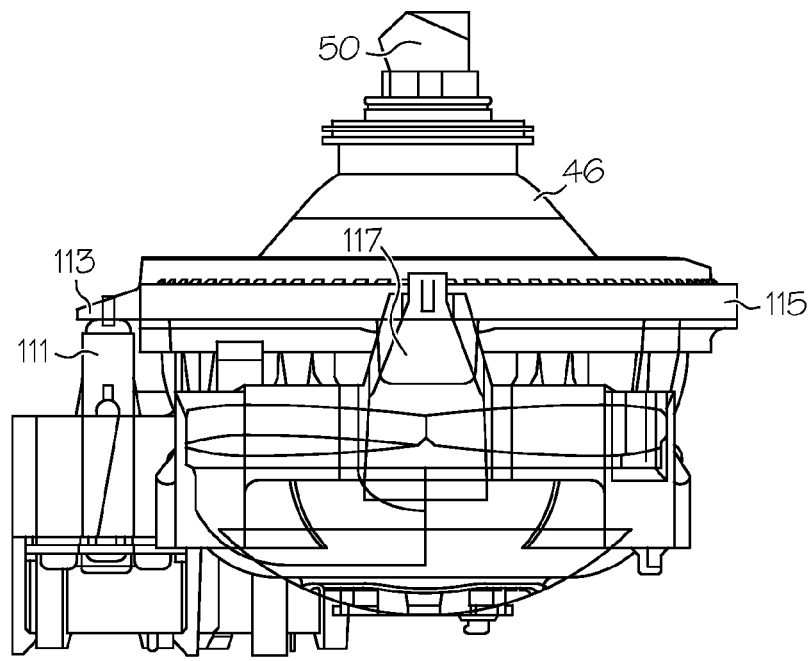
FIG. 2B is a side view of the transmitter with the housing removed, taken from the same direction as FIG. 2A.
Figure 2C:
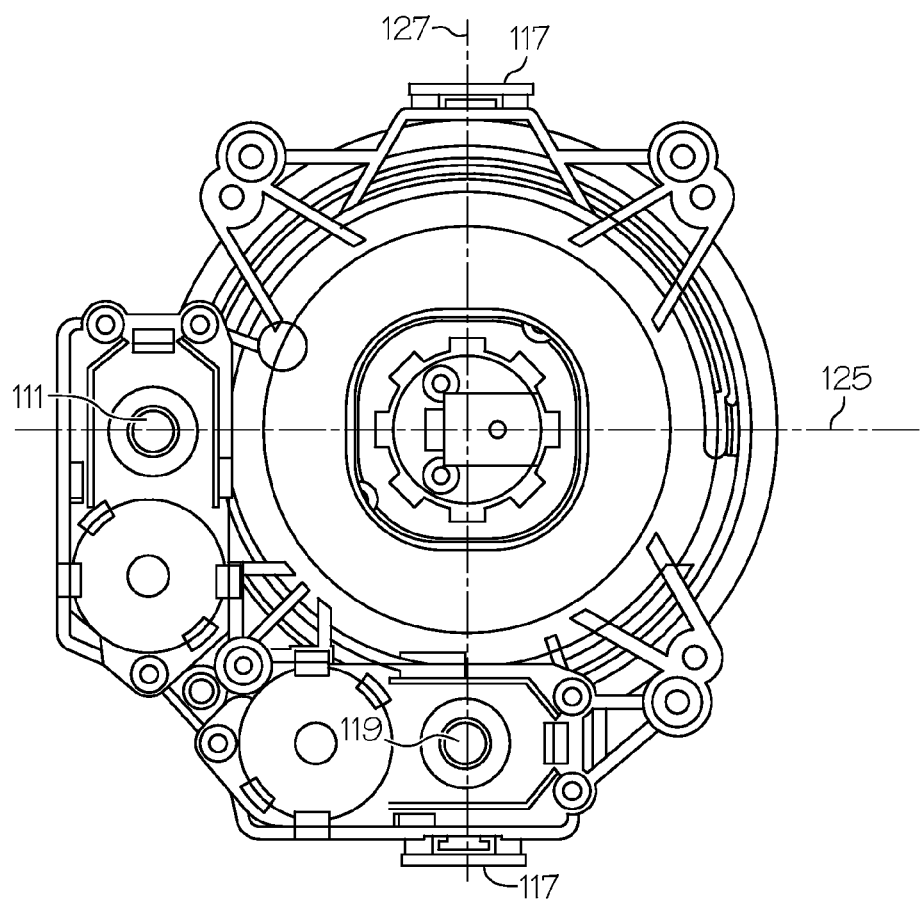
FIG. 2C is a bottom view of the transmitter with the housing removed.

It will be appreciated that the tilting of the circuit board 68 with respect to the housing 42 shown in FIGS. 5 and 6 is along a single axis. In the actual transmitter shown in FIGS. 1 through 4, however, four optical sensors are mounted on the circuit board 68, and the circuit board 68 that carries the laser diode 52, optics 56, bearing 64, rotor 70, and pentaprism 50 is arranged to be tilted in any direction, not just along one axis. As seen in FIGS. 2B, and 2C, to effect this tilting, a motor 111 raises and lowers cooperating tab 113 which is part of outer ring gimbal 115 that is supported by pivot structures 117 on opposite sides of the transmitter. In like manner, a second motor 119 tilts an inner gimbal ring 121 about an axis 125 that is parallel to the plane in which FIGS. 2A and 2B are taken. By operating both motor 111 and motor 119, the circuit board can be tilted simultaneously about axes 125 and 127, resulting in tilting in any desired direction. As a consequence, operating motors 111 and 119 can orient the laser source, support structure, including circuit board 68, pentaprism 52, and motor including rotor 70, in any of a range of tilted positions within the housing 42.

Figure 3:
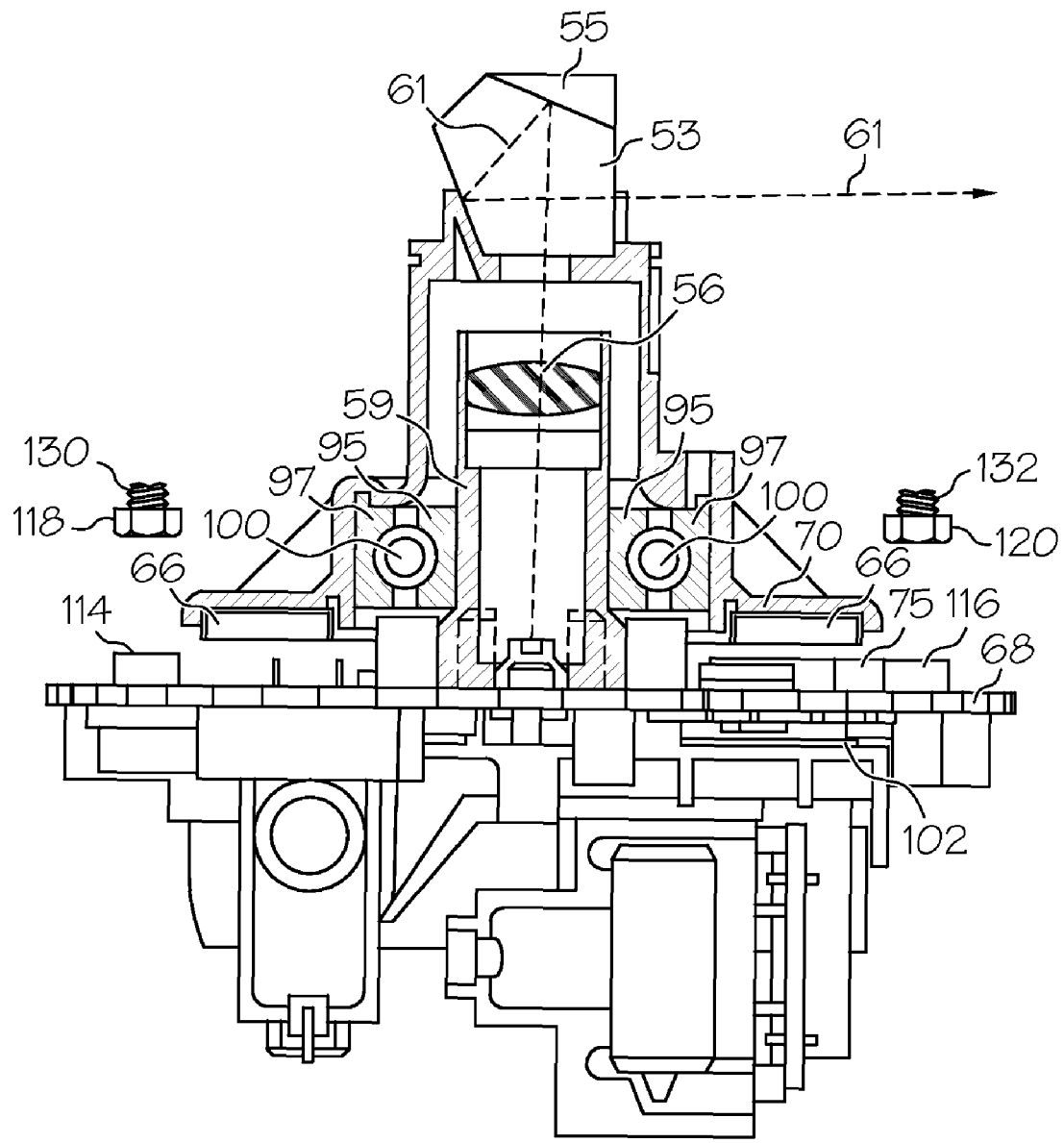
FIG. 3 is a sectional view, similar to FIG. 2, of a portion of the transmitter.
Figure 7:
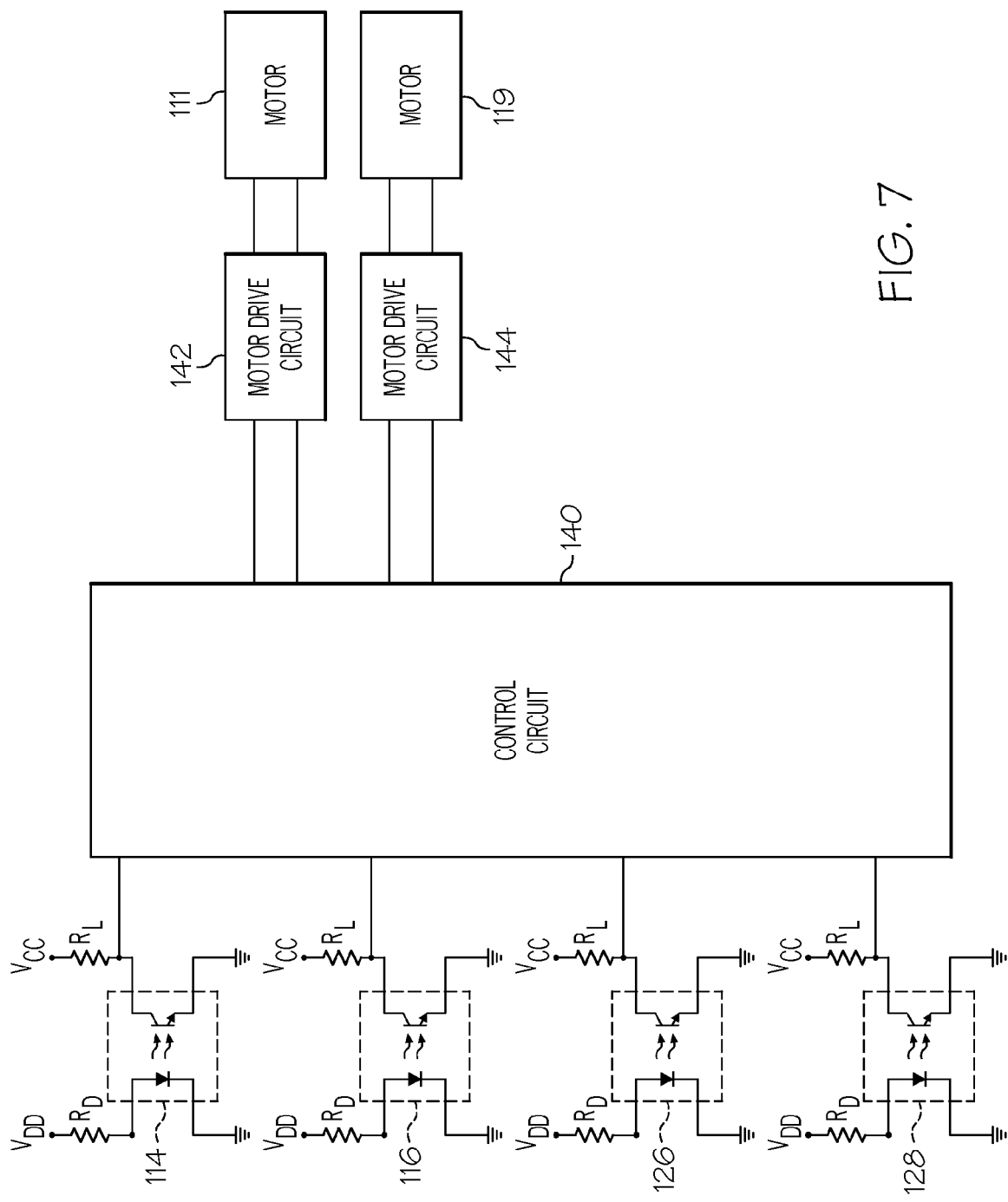
FIG. 7 is a schematic diagram showing control circuitry for the transmitter.

As seen in FIGS. 3 and 4, optical sensors 114 and 116 are mounted along a first axis 125, and optical sensor 126 and another optical sensor 128 (shown in FIG. 7) are mounted along a second axis 127, normal to axis 125. As seen in FIGS. 1 and 3, the optical sensors 114 and 116 have cooperating reflectors 118 and 120 that are mounted on the ends of bolts 130 and 132, respectively, which are threaded into openings inside housing 42 so that they can be set at a nominal distance from the optical sensors 114 and 116, and an adjustment made for manufacturing tolerances. Additional reflectors (not shown) are provided for cooperation with the optical sensors along axis 127.

It will be appreciated that if the sensors along axis 125 indicate a tilt of 5 degrees, and the sensors along axis 127 indicate a tilt of 0 degrees, then the maximum tilt at that time is 5 degrees. However, if the sensors along the axis 125 and the sensors along the axis 127 both indicate a tilt of 5 degrees, then the actual maximum tilt at that time is somewhat greater along an axis at a midpoint between axes 125 and 127. It is possible, therefore, to determine the maximum tilt experienced by the circuit board at any instant with respect to the housing 42, regardless of the axis of maximum tilt, and to prevent the circuit board 68 and associated components from tilting beyond a predetermined amount, regardless of the axis of maximum tilt. To accomplish this, transmitter control circuitry 140, illustrated in FIG. 7, simply determines the amount of tilt along axes 125 and 127, and makes reference to a look up table in circuit 140 in which the maximum tilt angle is provided for each of the combination of measured tilt angles. The control circuit 140 then limits the maximum tilt to no more than a predetermined maximum value, and controls motor drive circuits 142 and 144 to drive motors 111 and 119 accordingly.

Other aspects, objects, and advantages of the present invention can be obtained from a study of the drawings, the disclosure, and the appended claims.

What is claimed is:

1. A laser transmitter, comprising:
   a transmitter housing;
   a generally flat, circuit board stator;
   a rotor defining a central opening;
   a bearing, supporting said rotor for rotation about a rotation axis that is generally perpendicular to said generally flat, circuit board stator, and that is aligned with the center of said central opening;
   a laser source, mounted on said stator, for providing a beam of laser light directed outward from said circuit board stator in alignment with said rotation axis;
   a pentaprism assembly mounted on said rotor for rotation therewith, said pentaprism assembly receiving said beam of laser light through said central opening and redirecting at least a portion of said laser light outward in a direction normal to said rotation axis;
   a gimbal support for supporting said stator within said transmitter housing;
   a gimbal motor arrangement for orienting said gimbal support; and
   a plurality of pairs of light sources and light sensors for sensing the proximity of said circuit board stator with respect to the interior of said transmitter housing.

2. The laser transmitter of claim 1, in further comprising a plurality of reflectors on the interior of said transmitter housing for reflecting light from said light sources to corresponding light sensors in said pairs.

3. The laser transmitter of claim 2, in which said reflectors are adjustably positioned with respect to said housing.

4. A laser transmitter comprising:
   a transmitter housing;
   a laser source in said housing;
   a gimbal support arrangement for supporting said laser source in said housing, and including a gimbal motor arrangement for moving said gimbal support arrangement and said laser source in said housing;

gimbal motor drive circuit for actuating said gimbal motor arrangement to cause said gimbal support arrangement to move in said housing; and a plurality of optical proximity sensors, movable with said gimbal support arrangement, for sensing the orientation of said gimbal support arrangement with respect to the interior of said housing, whereby damage to said laser transmitter from movement within said transmitter housing is prevented.

5. The laser transmitter of claim 4, in further comprising a plurality of reflectors inside said transmitter housing for reflecting light from said optical proximity sensors.

6. The laser transmitter of claim 5, in which said reflectors are adjustably positioned with respect to said housing.

7. The laser transmitter of claim 5, in which there are four optical proximity sensors for sensing the proximity of the sensors to the interior of said housing, said four proximity sensors being spaced uniformly around the periphery of said gimbal support arrangement.

8. The laser transmitter of claim 7, in which the outputs of said four optical proximity sensors are combined to determine the amount of tilt of said gimbal support arrangement in the direction of maximum tilt.

9. A laser transmitter, comprising:
a transmitter housing;
a laser source and support structure;
a gimbal support for supporting said laser source and support structure within the transmitter housing; and
a plurality of optical sensors on said support structure for sensing the proximity of said support structure to the interior of said transmitter housing.

10. A laser transmitter according to claim 9, in which said optical sensors each comprise a light source and a light sensor, said sensor providing an indication of the amount of light reflected from the interior of said housing.

11. A laser transmitter according to claim 9, in which said transmitter includes a control circuit responsive to said plurality of optical sensors, for determining the amount of maximum tilt experienced by said support structure based upon the outputs from multiple sensors.

12. A laser transmitter according to claim 9, including four optical sensors equally spaced around the circumference of said support structure.

13. A laser transmitter according to claim 9, in which said transmitter includes reflectors inside said transmitter housing cooperating with said optical sensors.

14. A laser transmitter according to claim 9, in which the maximum tilt of the support structure is determined by reference to a look up table.

15. A method of positioning a laser source and support structure in the housing of a laser transmitter, said transmitter including a gimbal support for supporting said laser source and support structure, comprising the steps of:
providing a plurality of optical sensors on said support structure;
sensing the proximity of the interior of said transmitter housing with each of said optical sensors; and
preventing said support structure from being moved into contact with the interior of said transmitter housing.

16. The method of positioning a laser source and a support structure in the housing of a laser transmitter, according to claim 15, further comprising the step of determining the maximum tilt of said support structure based on outputs from said optical sensors.

17. The method of positioning a laser source and a support structure in the housing of a laser transmitter, according to claim 16, further comprising the step of limiting the maximum tilt to a predetermined maximum such that said support structure is prevented from contacting said interior of said housing.

18. The method of positioning a laser source and a support structure in the housing of a laser transmitter, according to claim 15, in which the step of providing a plurality of optical sensors on said support structure includes the step of positioning said optical sensors around the periphery of said support structure.

19. The method of positioning a laser source and a support structure in the housing of a laser transmitter, according to claim 18, in which the step of positioning said optical sensors around the periphery of said support structure includes the step of spacing four optical sensors equally around the periphery of said support structure.

20. The method of positioning a laser source and a support structure in the housing of a laser transmitter, according to claim 19, further comprising the step of determining the maximum tilt of said support structure based on outputs from said four optical sensors, such that the maximum tilt can be determined regardless of the axis along which it occurs.

* * * * *